J. W. CARTER.
TESTING MACHINE.
APPLICATION FILED NOV. 16, 1909.
968,325.
Patented Aug. 23, 1910.
2 SHEETS—SHEET 1.
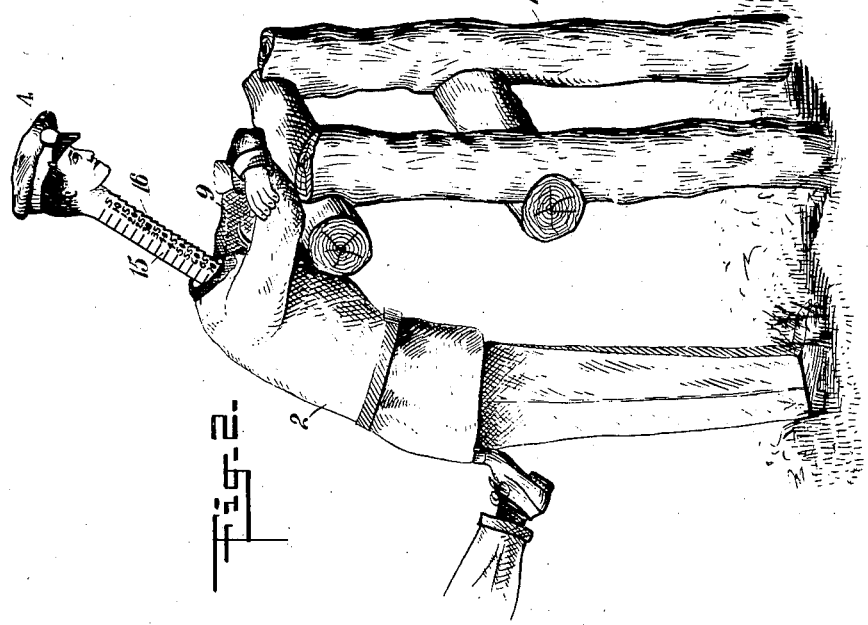
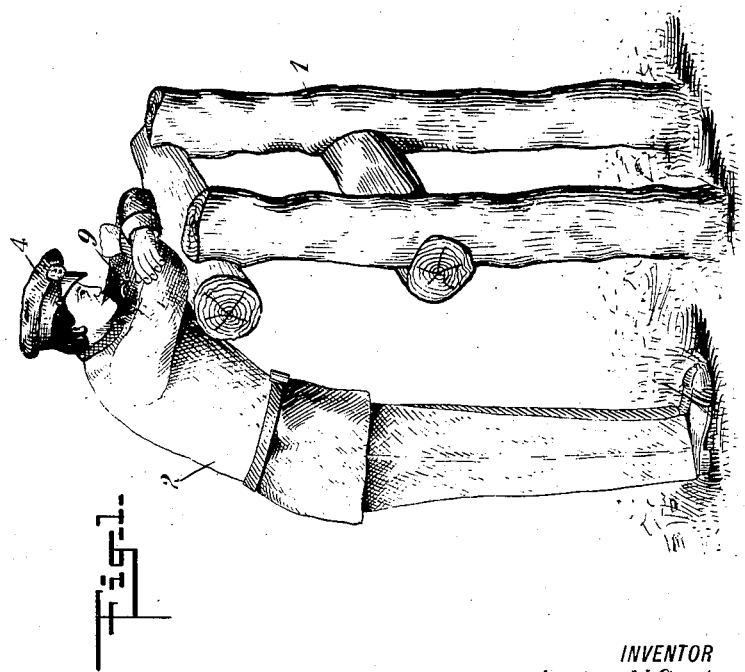
WITNESSES
INVENTOR
Jennings W. Carter
BY
ATTORNEYS

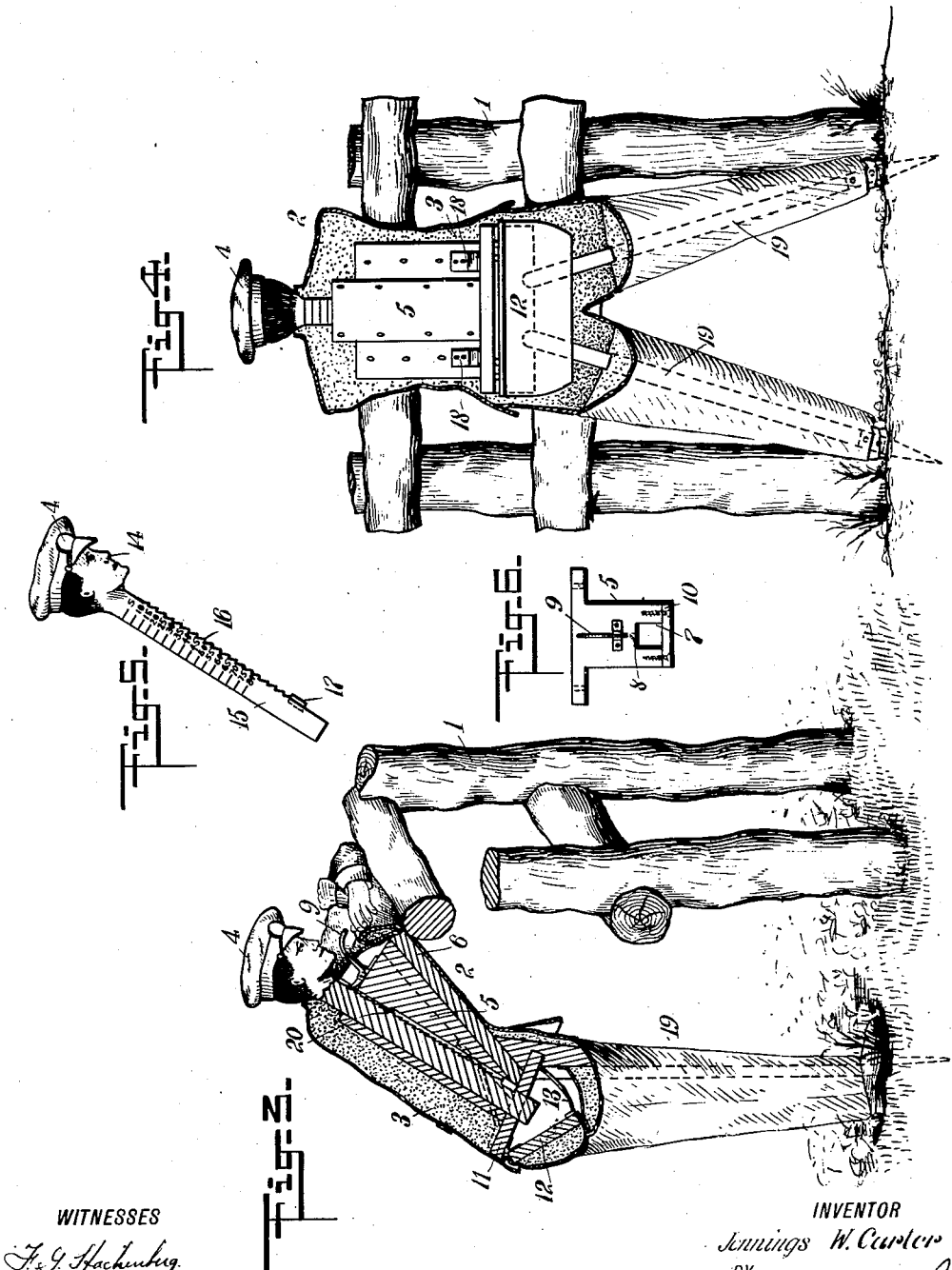

UNITED STATES PATENT OFFICE.

JENNINGS WILLIAM CARTER, OF MANILA, PHILIPPINE ISLANDS.

TESTING-MACHINE.

968,325.  Specification of Letters Patent.  Patented Aug. 23, 1910.

Application filed November 16, 1909. Serial No. 528,334.

*To all whom it may concern:*

Be it known that I, JENNINGS W. CARTER, a citizen of the United States, and a resident of Manila, Philippine Islands, have invented a new and Improved Testing-Machine, of which the following is a full, clear, and exact description.

My invention relates to testing machines, more particularly to that class of testing apparatus for determining the power of a blow, and has for its object to provide an apparatus for estimating the force of a blow delivered with the hand or foot.

My invention comprehends an artificial figure of a human being, preferably attired as a policeman, soldier or the like, provided with an elongated neck, having thereon a graduated scale, the said neck being slidably inclosed in a casing, with the lower extremity of the neck projected beyond the casing for engagement with a padded clapper-board which receives the blow delivered and imparts the force exerted by the same to the slidable neck.

My invention further comprehends certain novel features of construction and combination of parts, as will be hereinafter more fully described and particularly set forth in the appended claims.

Reference is to be had to the accompanying figures, forming a part of this specification, in which similar characters of reference denote corresponding parts in all the views, and in which—

Figure 1 is a perspective of my device in its initial position before the blow has been delivered; Fig. 2 is a perspective, similar to Fig. 1, but depicting my device after the blow has been delivered; Fig. 3 is a view similar to Fig. 1, parts being shown in section and parts in perspective; Fig. 4 is a rear view, portions being broken away to show the underlying parts; Fig. 5 is a side elevation of the elongated neck, with the head integral therewith, and Fig. 6 is a plan view of the interior casing of my device showing the dog and longitudinal aperture adapted to slidably receive the elongated neck.

Inclined against a suitable support 1, in an attitude indicating rest or repose, is an artificial figure 2. The figure comprises primarily a body 3 and a head member 4. The body 3 has therein a casing 5 secured to a suitable board 6 fastened at one end to the support 1. The casing 5 having a triangular shape contains a slot 7 extending longitudinally through the said casing and a groove 8 extended partially the length of the said casing. Attached to the upper face of the casing 5 is a suitable dog member 9, and fastened by means of suitable screws to the said casing 5 is a board 10 forming a cover for the slot 7. The casing 5 and board 6 securely rest on a base 11 having hingedly fastened thereon a padded clapper-board 12 held in movable position by a strap 13 secured to the clapper-board 12 and the board 11. The head member 4 comprises a face 14 and an elongated neck 15 having thereon a series of graduated numbers as is clearly shown in Figs. 2 and 5. The inner side of the neck 15 has numerous projections 16 adapted to be of a shape similar to that of the teeth on a saw, and secured to the lower end of the neck 15 is a lug 17.

The elongated neck 15 of the head member 4 is adapted to slide in the casing 5 and is made of a length so that when the head member 4 rests in the position shown in Figs. 1 and 3, the lower end of the neck 15 will extend beyond the casing 5 as is clearly shown in Fig. 3. Suitable braces 18 secured to the casing 5 and braces 19 extending longitudinally through the lower limbs of the figure are provided, the braces 19 having pointed ends for securely holding the figure to the ground or platform upon which it stands.

The operation of my device is as follows: A blow projected upon the padded clapper-board 12 forces the clapper board upwardly and the said clapper board contacting with the extended end of the head member slidably located in the casing 5, imparts the force of the blow to the said head member 4 and projects the same upwardly and outwardly from the casing 5. When the head member 4 is projected upwardly a distance substantially equal to the initial blow, the dog member 9 engaged by the projections 16, prevents the head member 4 from returning to the casing 5 and the numbers on the neck 15 of the head member 4 register the force of the blow. To return the head member 4 to its original position, a slight pressure exerted on the dog member 9 releases the same from the projections 16 and the said head member slides back into the casing 5. The lug 17 provided on the neck 15 of the head member 4 prevents the said head member from leaving the casing 5 altogether, the said lug being adapted to slide in the groove 8 extended along the casing 5 to the point 20.

Although I have shown my device as representing a soldier, it will be understood that the particular kind of figure used need not be limited to one such as I have shown for the purpose of describing my invention. It will also be seen that the clapper board need not necessarily be on the posterior portion of the figure, but can be placed in various positions on the figure depending entirely upon which portion of the figure is to receive the blow. It will furthermore be seen that any vending apparatus can be attached to my invention, whereby a coin deposited in a slot will permit of using the device, thereby dispensing with an operator and permitting of economically operating a machine of the kind described.

Having described my invention, I claim as new and desire to secure by Letters Patent:—

1. A testing machine, comprising a casing, adapted to represent a dummy figure, a clapper board hingedly mounted on the casing, a serrated member provided with a head and slidably mounted in the casing, indicating means on the said serrated member, means hingedly mounted exterior the casing and adapted to engage the serrated member, to releasably hold the same, and the said serrated member being adapted to be engaged by the said clapper board to move the serrated member upwardly when a blow is indicated on the clapper board.

2. A testing machine, comprising a casing, adapted to represent a dummy figure, a clapper board hingedly mounted on the casing, a serrated member provided with a head and slidably mounted in the casing, with the said serrated member being adapted to slide upwardly in the casing when engaged by the said clapper board, indicating means on the said serrated member, means hingedly mounted exterior the casing and adapted to engage the serrated member, to releasably hold the same and stop means on the said serrated member, for limiting the movement of the said member in the said casing.

In testimony whereof I have signed my name to this specification in the presence of two subscribing witnesses.

JENNINGS WILLIAM CARTER.

Witnesses:
U. A. DORRINGTON,
M. L. STEWART.